United States Patent [19]
Kunert

[11] 3,751,826
[45] Aug. 14, 1973

[54] DEVICE FOR THE APPLICATION OF PRINTED LEARNING PROGRAMS

[76] Inventor: Heinz Kunert, Belvenerestr. 15, Cologne, Germany

[22] Filed: Sept. 3, 1971

[21] Appl. No.: 177,793

[30] Foreign Application Priority Data
Sept. 28, 1970 Germany.................. P 20 47 599.4

[52] U.S. Cl. ............................. 35/9 F, 35/62, 35/74
[51] Int. Cl. .............................................. G09b 3/02
[58] Field of Search......................... 35/9 E, 9 F, 62, 35/66, 74; 346/21

[56] References Cited
UNITED STATES PATENTS

| | | |
|---|---|---|
| 1,177,652 | 4/1916 | Robertson........................... 35/74 X |
| 1,641,982 | 9/1927 | McDade .......................... 35/9F UX |
| 3,011,854 | 12/1961 | Allen................................ 35/66 UX |
| 3,146,531 | 9/1964 | Whitney................................ 35/9 F |
| 3,284,924 | 11/1966 | Parmenter............................ 35/9 F |

Primary Examiner—Harland S. Skogquist
Attorney—Harold T. Stowell, Thomas J. Greer, Jr. et al.

[57] ABSTRACT

A programmed learning device employing a plurality of rotating discs with questions and answers provided thereon and an eraseable surface with cooperating eraser in a housing provided with windows.

9 Claims, 9 Drawing Figures

PATENTED AUG 14 1973

PATENTED AUG 14 1973  3,751,826
SHEET 2 OF 4
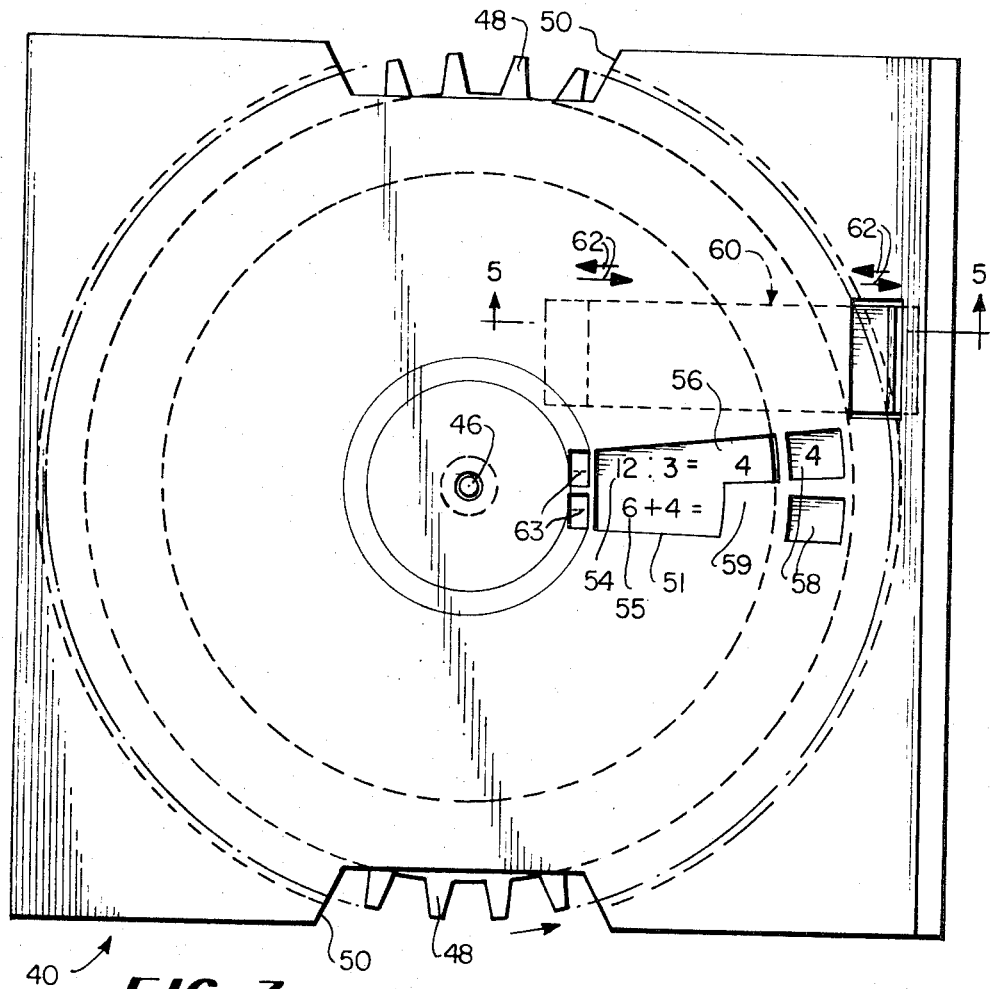
FIG. 3
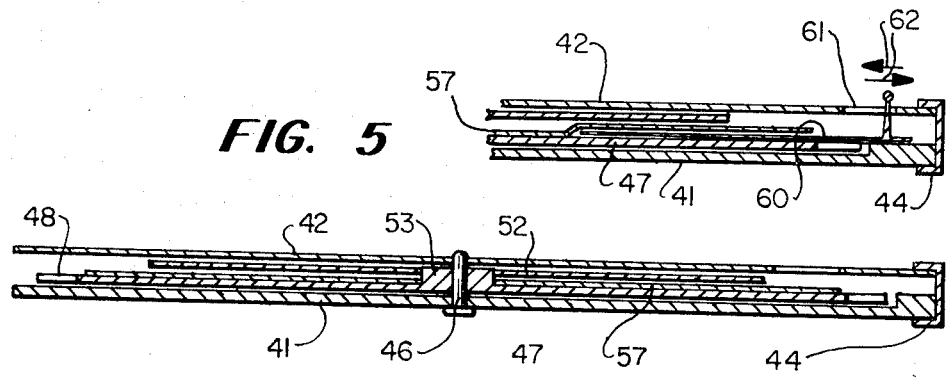
FIG. 5
FIG. 4

DEVICE FOR THE APPLICATION OF PRINTED LEARNING PROGRAMS

This invention relates to a device for the application of printed learning programs, consisting of a bottom plate and an identical lid plate, between which there is arranged a turning disc which reveals a laterally graspable circumference toothing or the like for the purpose of turning the turn-table around a pivot anchored in the bottom plate. The device furthermore consists of a learning program sheet which is arranged for common rotation on the rotating discs and on which program problems and their solutions are printed in circle-sector-shaped fields, whereby a circle-sector-shaped window is made in the cover plate through which simultaneously at least two successive program problems and the solution of one of the program problems will be visible and through which the user can record his program solution on a writing support which is arranged on the turning disc for common rotation with the latter.

In known devices of this kind, the writing support consists of a circular disc-shaped sheet of paper which has a diameter smaller than the learning program sheet so that one can write the solution, through the radially-interior part of the circle-sector-shaped window in the cover plate on this piece of paper. The known learning programs, in which the student writes down a solution for each program problem, are pedagogically particularly advantageous among others, for two reasons:

Because the student must decide on a solution to be written down, his readiness to make decisions is trained during the application of the learning program; on the other hand, the learning subject matter is imparted particularly intensively by writing the answers down. It is also known that one can considerably further reinforce these two effects by giving the student an opportunity quickly, easily, and without trace once again to erase a solution that has been written down, provided it is wrong, and to replace it with the correct solution. This on the one hand promotes the decision-making readiness of the student because, even though he may be uncertain, he can decide for a solution which he considers correct, that is to say, the student is not tempted to look up the correct program solution before writing his solution down. On the other hand we can avoid a false solution, whichhas been written down, which is not immediately erased, and replaced with the correct solution, from becoming particularly retained. In the above-discussed known devices for the application of printed learning programs, these two criteria are not met because the solution is written down on a paper from which the entry can be removed with an eraser only rather laboriously which is particularly problematical because of the fact that the entry is made in the narrowest part of the window. Besides, in this known arrangement, the entry sheet must be exchanged after every complete rotation of the rotating disc, in other words, after the program sheet has been worked over once. In this known device, no advantage whatsoever is derived from the circular-ring-shaped, endless arrangement of program problems.

The purpose of the invention is to create a device for the application of printed learning programs, in which these disadvantages will not appear and which will stimulate both the readiness to make decisions and which will improve the imparting of the correct answer, whereby the device at the same time is to be so designed that the person working can uninterruptedly work on the program repeatedly until he has committed the particular program to memory.

The solution of this and other problems arising out of the following description are considered obvious in the opinion of the expert in a device of the type described according to the invention in the beginning, is accomplished in the following manner: the writing support is an in itself known writing tablet which can repeatedly be written on and which can be quickly and easily erased, and between the cover plate and the bottom plate, there is provided a writing slate erasing device for the automatic erasure of the writing slate in case of a rotation by 360°.

Writing slates, which can be repeatedly written on and which are quickly and easily erasable, are known. Such a slate if, for example, a tablet used in grade schools, formerly made of a slate plate and recently made of a composite (layered) plate, where the writing can easily be erased with a wiper. Another known plate of this type is the plate known under the trade name of Printator which consists of a solid supporting plate, a colored foil, a milky-white foil, and a glass-clear foil, whereby one can write on this clear-glass foil with a knitting-needle-like stylus. Under the pressure of this stylus, the colored foil adheres to the milky-white foil, so that a line is produced. If the two foils are separated from each other again, the line disappears. The known, quickly and easily erasable writing tablets described here are intended only as examples because other kinds of such writing tablets can be used also within the framework of the invention.

According to one preferred version of the invention it is provided that the rotating disc itself is the writing tablet. This givse a particularly simple design whereby the rotating disc is simply made of the material from which one makes modern school blackboards.

The writing tablet erasing device is, for example, a wiper which rests against the topside of the writing tablet.

One can arrange such a wiper firmly at any desired place inside the device so that it will erase the entered solutions upon every rotation of the rotating disc. According to one preferred form of the invention, it is provided that the wiper is arranged on a manually operated swing arm directly in connection with the window and can be swung into the window so that the user, the moment he determines that the solution he has entered is wrong can quickly swing the wiper into the window and erase the false solution entered in order then to enter the correct solution.

The part of the window intended for the entry of the solution according to one preferred version of the invention is located radially outside that part of the window below which the program problems and program solutions are arranged. In this way we can use the widest part of the window for the recording of the solution in case of the circle-sector-shaped form of the window.

In a further development of the invention it is provided that the window reveals a part through which the user can enter control symbols on the writing tablet or its learning program sheet, whereby the writing tablet erasing device is so designed that it will not erase the control symbols in case of a complete rotation of the rotating disc. In this manner, the user can keep an eye on his performance during the process of working on the program by marking the program problems whose solution he has already mastered, so that he can save himself the trouble of working on them again when the program is repeated.

In this case, the writing tablet erasing device can best be adjusted to a position in which it will also erase the control symbols in case of a complete rotation of the rotating disc.

This idea, that is, to design the writing tablet erasing device in such a manner that, according to the desire of the user, sections of the surfaces of the writing tablet, located on a circular ring of the writing tablet, will not be erased in case of a complete rotation of the rotating disc and will be erased by the user only after corresponding adjustment of the writing tablet erasing device, is usable not only for control symbols but, within the framework of the invention, is also generally applicable in such a manner that parts of the entry of the user on the writing tablet will be erased, in case of a complete rotation of the rotating disc, only if the user correspondingly adjusts the writing tablet erasing device.

In that version of the device according to the invention, with which numerous learning progrm sheets are to be worked on, the cover plate can be flipped up in order to exchange the learning program sheet; on the other hand, another version of the invention provides that the bottom plate and the cover plate are firmly connected with the intermediate rotating discs and learning program sheet as well as writing tablet. Such a device thus serves only to work on a single program sheet which, of course, can be worked on as often as desired. This version of the device will be produced from particularly low-cost working materials, for example, papermache, while the version, in which the learning program sheets are exchangeable, can best be made of durable material, for example, plastics.

Further purposes, features, and advantages of the invention emerge from the following description of some of the examples serving for explanation and not for delimiting the basic idea behind the invention, whereby reference is made to the attached drawings.

IN THE DRAWINGS

FIG. 3 is a top view on another version corresponding to FIG. 1;

FIG. 4 is a cross section through the version according to FIG. 3, corresponding to FIG. 2;

FIG. 5 is a partial cross section roughly along line V—V in FIG. 3;

Figure 1:
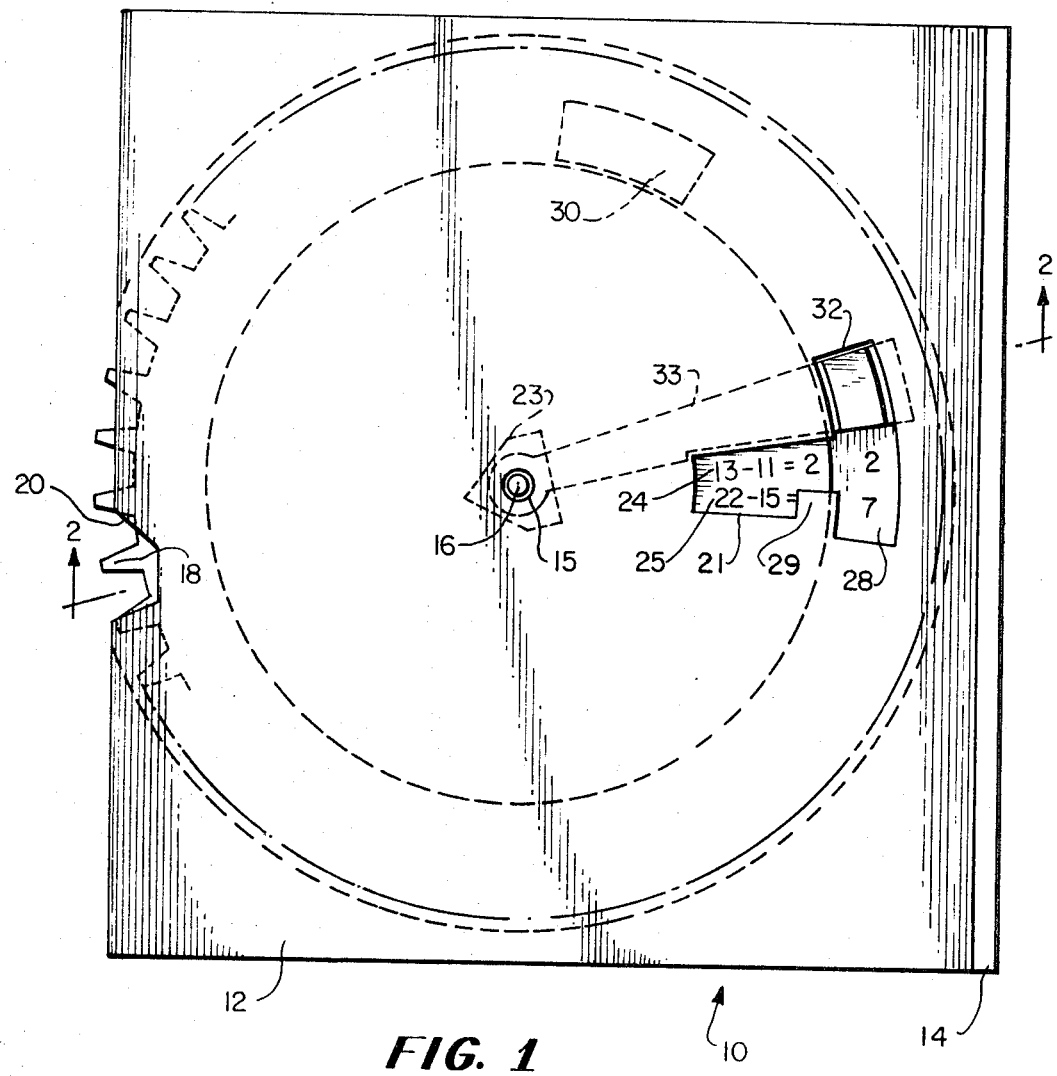
FIG. 1 is a top view on a first version of the device according to the invention.
Figure 2:
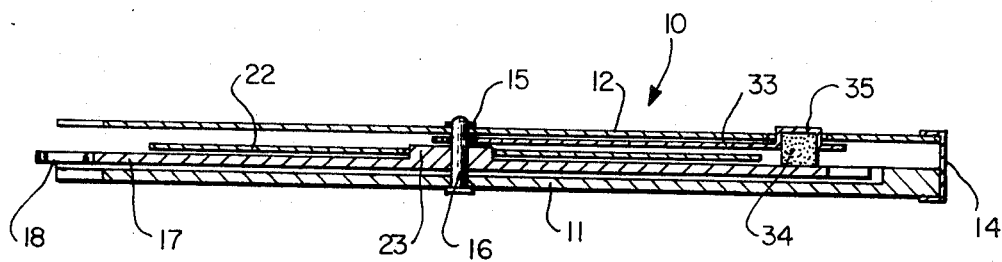
FIG. 2 is a cross section roughly along line II—II in FIG. 1, whereby the individual parts are drawn excessively thick for the sake of greater clarity.

The version of the device 10 according to the invention, illustrated in FIGS. 1 and 2, consists of a bottom plate 11 and a cover plate 12 which are connected with each other in an articulated manner by means of a hinge or a link 14 on one edge, so that one can open them like the covers of a book. In the middle in the bottom plate 11 there is attached a pivot 16 which, when the cover plate is closed, protrudes through a hole in that plate, whereby this hole in the cover plate 12 can be provided with a reinforcing ring 15. If one wants to hold the device firmly in the closed position, one can design ring 15 in the form of a spring clamping ring which is clamped upon the protruding end of the pivot 16. Around pivot 16 there is rotatably positioned a rotating disc 17 which lies upon bottom plate 11 and which has a circumferential toothing 18 along its circumference. This circumferential toothing 18 protrudes over the bottom and cover plate 11, 12 at one side so that one can grasp it here with one finger. There is a cutout 20 in the bottom and in the cover plate 11, 12 and this cutout is best so designed that, if one pushes a tooth of the circumferential toothing 18 through the recess 20, the rotating disc 17 will be rotated exactly so far that the next line 24, 25, of the learning program sheet yet to be written on, will appear in a window 21 in the cover plate.

The learning program sheet 22 lies on rotating disc 17 and has a smaller diameter than the latter. On the topside of the rotating disc 17, there is a non-axially-symmetrical boss 23 which, in the top view, for example, has the shape of an isosceles triangle with a rectangle put on. Instead of the non-axially-symmetrical boss 23 we can also provide other protrusions in a non-axially-symmetrical arrangement. Learning program sheet 22 reveals a center opening which fits on the boss 23 so that the learning program sheet will rotate with the rotating disc 17. The learning program sheet is subdivided into circle-sector-shaped fields, whereby in every field (see FIG. 1), one program problem 24, 25 and, next to it, its solution are contained. The ring-strip of the rotating disc 17, which is located radially outside the learning program sheet 22, again and again constitutes the plate which can be written on and which is easily erasable. In the example according to FIGS. 1 and 2, the rotating disc 17 itself, constitutes this plate and consists of a plate of the kind from which one makes school blackboards.

It was mentioned earlier that there is a window 21 in the cover plate 12. This window 21 essentially has a circle-sector-shaped form and is as wide as two circle-sector-fields of the learning program sheet 22 so that 2 learning program problems 24, 25 are visible in this window. The window reveals a protrusion 29 which covers the solution for problem 25 which is printed on learning program sheet 22. Window 21 extends also over that part of the rotating disc 17 which is used as writing tablet. This part of the window is labeled 28 in FIG. 1.

Under the cover plate 12, someplace along the circumference, there is attached a writing tablet erasing device in the form of a wiper 30 which erases the entry on the writing tablet when the particular part of the writing surface moves under the wiper.

In order to use the device according to FIGS. 1 and 2, the user first of all, with the cover plate 12 flipped up, places a learning program sheet 22 on the rotating disc 17 and once again closes the cover plate 12. He writes the solution for program problem 25, which he believes to be correct, in part 28 of the window, without being able to recognize the correct solution. Now he turns the rotating disc 17 by means of circumferential toothing 18 by one more step, so that the learning program problem, which until now has been at 25, will come to rest at 24 and so that likewise the solution entered by the user will also move on. The user can now compare the printed, correct solution with the solution he has entered. Then he enters the solution for the next program problem 25, which he believes to be correct, in part 28 of the window, etc.

If the solution entered by the user turns out to be wrong, he can immediately erase it again and replace it with a new one. For this purpose, a swing arm 33 is swingably attached around pivot 16 and this swing arm carries, on its free end, a wiper 34 which, when in its resting position, lies in a widening 32 of the window 21. When the user wants to erase the solution he has entered, he grasps the protruding part 35 of the swing arm 33 and swings the latter by one sector width in the clockwise direction (FIG. 1), so that the wiper 34 will erase the solution that has been entered. After swinging the wiper back, the student can enter the correct solution so that this solution, and not the wrong solution, will be imparted in his memory.

Wiper 34, when it is provided, performs the function of the writing tablet erasing device 30, so that the latter can if necessary be omitted.

In the version of the device 40 according to the invention, illustrated in FIGS. 3-5, we have once again provided a bottom plate 41 and a cover plate 42, connected by a link 44, whereby a pivot 46 is attached in bottom plate 41. The rotating disk 47 also here reveals, for the purpose of rotating it, a circumferential toothing 48 which is accessible in two cutouts 50 to the bottom cover plates 41, 42. The writing tablet 57 is arranged directly on the rotating disk 47 and, according to the schematic illustration in the drawings, is to be, for example, the initially explained Printator writing tablet. The learning program sheet is labeled 52 and has a smaller diameter than the writing tablet 57. Here again, there is provided a non-axially-symmetrical boss 53 which connects the learning program sheet 52 and, if necessary, the writing tablet 57 for the purpose of joint rotation with the rotating disk 47. The window in cover plate 42 is labeled 51 and essentially has the same shape as window 21 in the previously described version, with the exception that the parts 58 of the window, provided for the entry of the solution considered correct, are made separately from window 51. Here again a part 59 covers the preprinted correct solution of the lower program problem 55, while the correct solution 56 of the upper program problem is visible in window 51 so that the person working on this can check the solution he has selected.

In the described Printator writing tablet, the erasing device is made out of a flat piece of sheet metal which is arranged between the colored and the milky-white foil and which separates both foils from each other during the rotation of rotating disc 47. This sheet metal, constituting the writing table erasing device 60, does not turn with the turntable but instead is held torsion-proof on the bottom plate 41.

It is particularly advantageous if, according to the illustration in FIG. 3, we widen the window 51 by a control entry part 63 through which the user can enter control symbols on the writing tablet if he has correctly written down the solution to one program problem. In case of repeated working on the learning program sheet, the user can then omit working on these program problems which have already been solved. The part of the writing tablet which bears these control entries of course must not be erased in case of a onetime rotation of rotating disk 47; instead, it must stay where it is so long as work is being done on the program. In order finally to erase also this part of the writing tablet, the writing tablet erasing device 60 is made in the form of a slide which can be moved in the direction of the two arrows 62. A handle sticks through an opening 61 in cover plate 42 so that the user can move the writing table erasing device-slide in FIGS. 3 and 5 to the left, if he wants to erase the control entry part of the writing tablet, while, in the course of normal work on the program, he leaves the writing tablet erasing device-slide in the right-hand end position.

In FIGS. 1-5 we described versions in which the cover plate 12, respectively, 42, can be flipped up, in order to be able to exchange the learning program sheet. With these devices 10, 40 we can thus work on an unlimited number of learning program sheets one after the other. Accordingly, we will make the parts of the devices 10, 40 of durable material, for example, plastic.

Figure 6:
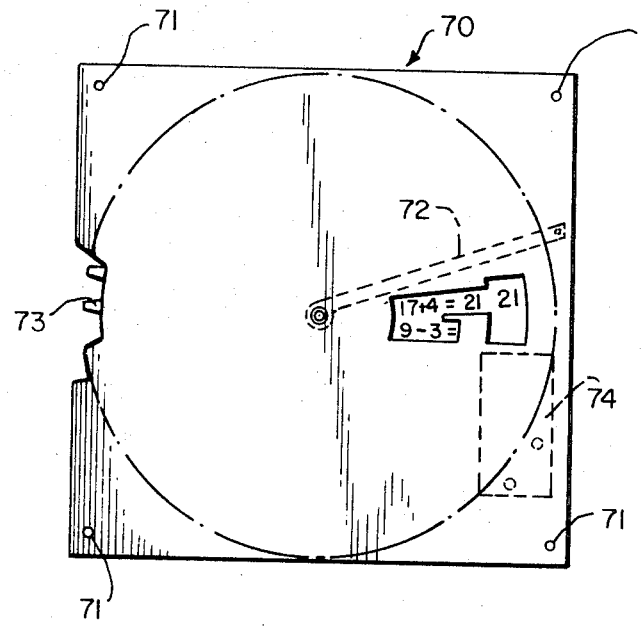
FIG. 6 is in a somewhat smaller illustration, a top view on another version of the device according to the invention.
Figure 7:
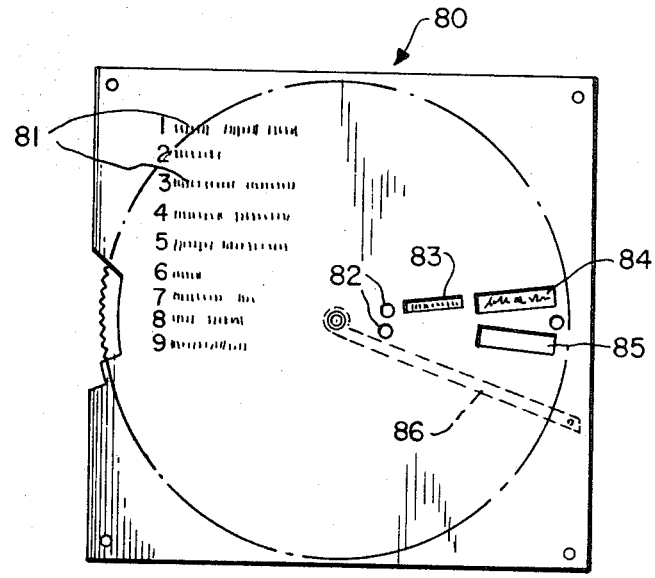
FIG. 7 is an illustration of another version, corresponding to FIG. 6.

The versions shown in FIGS. 6 and 7, on the other hand, are intended for working on just one learning program sheet.

In the version according to FIG. 6, device 70 consists of two equally large plates which are firmly connected with each other, for example, by means of rivets 71. Between these plates there is arranged the rotating disk on which has been printed the learning program and which reveals a circumferential toothing 73 and which can be rotated around a central pivot. At least in the outer area of the edge, the rotating disk is made in the form of a writing tablet on which one can write repeatedly and which can be easily and quickly erased. For erasing we use either a radially arranged sheetmetal strip 72 or a sheetmetal strip 74, attached to the outside, and with these strips the colored foil is separated from the milky-white foil, if the rotating disk is rotated past the erasing device. The examples 72 and 74 of the erasing device illustrated of course are alternative, that is, both of them are not used simultaneously.

In arithmetic learning programs, the available space in the circle-sector fields usually suffices to enter the program problem; in longer text problems, however, it may often happen that the space available in the sector fields is not enough for the reproduction of the complete program problem. In this case, according to the illustration in FIG. 7, in the case of device 80, one can provide that the program problems will be printed according to the illustration at 81 on the cover plate, whereby the individual problems are numbered in sequence. Instead of the complete reproduction of the problem, we then print on the rotating disk only the numbers of the problems which are visible through correspondingly small windows 82. In window 83 there appears then the preprinted, correct solution, while the windows 85, respectively 84, serve for the entry and control of the entered solution.

One recognizes that the versions of the invention illustrated in FIGS. 6 and 7 are suited for just for one-time use. Instead, one can work on the program contained in these devices 70, 80 as often as one desires because the entries are erased again with every rotation of the rotating disk.

Figure 8:
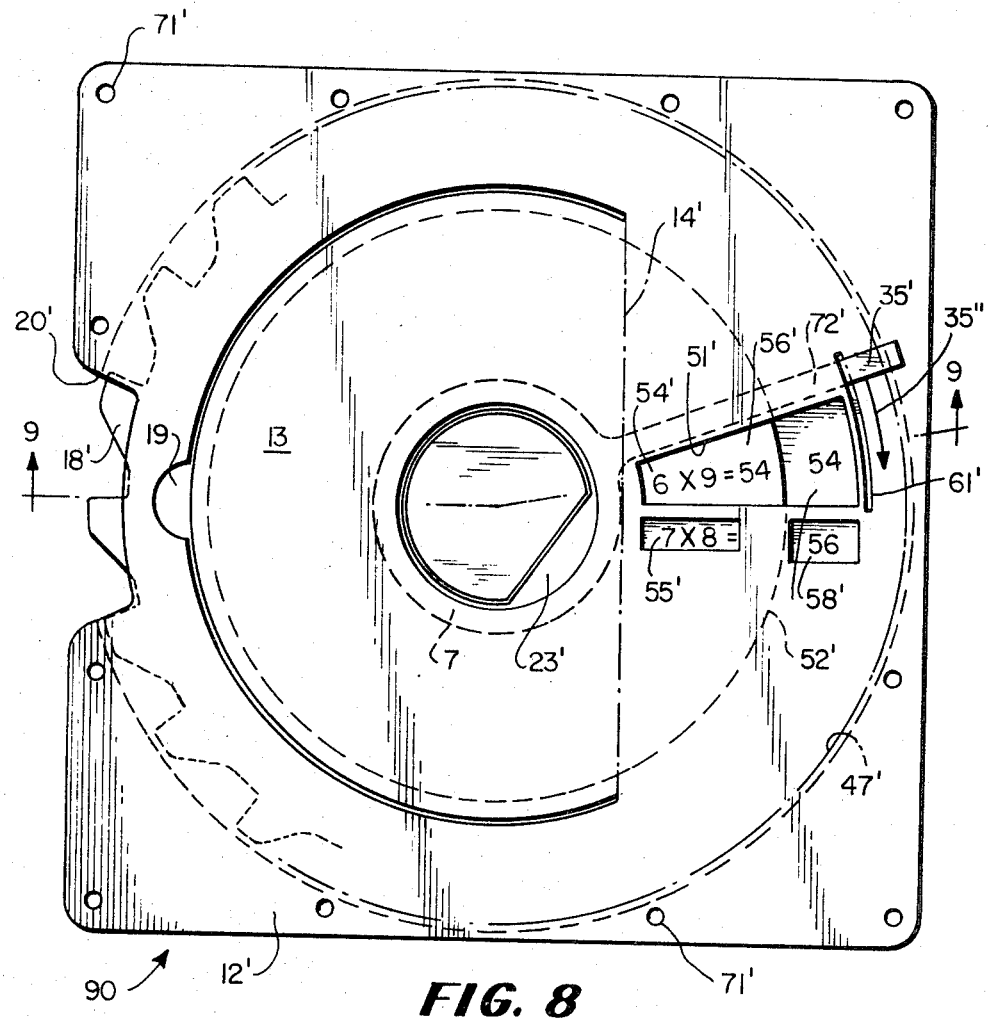
FIG. 8 is an illustration, corresponding to FIG. 1, showing a further version of the invention.
Figure 9:
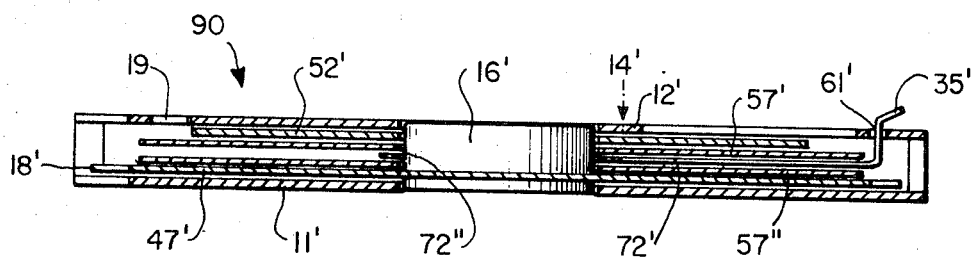
FIG. 9 is an illustration, corresponding to FIG. 2, showing a cross section along line IX—IX in FIG. 8.

The example of the invention illustrated in FIGS. 8 and 9 advantageously combines features from the three versions described so far. In FIGS. 8 and 9, those parts which correspond to elements in FIGS. 1–7 are provided with the same reference symbols, with the addition of an apostrophe.

In the device 90 according to FIGS. 8 and 9, the cover plate 12' and bottom plate 11' are firmly connected by means of rivets 71' or the like. However, the middle part 13 of the cover plate 12' can be flipped up around a link 14' in order to be able to exchange the learning program sheet 52'.

A cutout 19 in the cover plate 12' makes it easier to flip up the middle part 13. The pivot 16' is firmly connected with the rotating disk 47' and rotates in a recess in bottom plate 11' and in a recess in the middle part 13 of cover plate 12'. A toothing 18 and a recess 20 are provided according to FIG. 1. The pivot 16' reveals an eccentric recess 23' over the rotating disk 47' into which the learning program sheet 52' and the writing tablet engage so that both of them turn together with rotating disk 47'. The writing tablet is a Printator writing tablet, as it was described in the beginning, with two foils 57' and 57", between which there is radially arranged a flat sheetmetal or plastic strip as writing tablet erasing device 72'. This device is located next to window 51' and erases the writing tablet during every complete rotation. The writing tablet erasing device is placed around pivot 16' with a ring 72" and protrudes to the outside through a circle-arc-shaped slit 61' in the cover plate 12' with a part 35. One can therefore swing the writing tablet erasing device 72' with one finger, in the direction of arrow 35", into the window 51' or back, in order immediately to erase a false solution in the upper part of window 58'. The window in cover plate 12' is made not in a connected (continuous) fashion but rather in several parts. But this is immaterial as far as the function (operation) of the device is concerned. The problems and solutions visible in FIGS. 8 and 9 are labeled, as in FIG. 3, with 54', 55', respectively, 56'.

What is claimed is:

1. Device for the application of printed learning programs, consisting of a bottom plate, a cover plate, a rotating disk arranged between them which reveals a manually graspable circumferential toothing or the like for the rotation of the rotating disk around a central pivot, a learning program sheet arranged on the rotating disk for rotation therewith and on which are printed program problems and their solutions in sector-shaped fields, a writing surface, a sector-shaped window in the cover plate, through which simultaneously at least two successive program problems and the solution of one of the programs will be visible and through which the user can record his program solution on said writing surface, which surface is on the rotating disk, the said writing surface capable of being written on repeatedly and can be erased, a pivotal erasing device positioned between the cover plate and the bottom plate for the automatic erasing of the writing tablet in case of a rotation by 360° and also for erasing a limited angular extent of said writing surface.

2. Device according to claim 1 characterized by the fact that the rotating disk defines the writing surface itself.

3. Device according to claim 2 characterized by the fact that the erasing device is a wiper which rests against the top of the writing surface.

4. Device according to claim 3 characterized by the fact that the wiper is carried by a manually operable and swingable arm, the wiper being swingable into the said window.

5. Device according to claim 2 characterized by the fact that the part of the window which is intended for the entry of the solution lies radially outside that part of the window below which the program problems and program solutions are arranged.

6. Device according to claim 1 characterized by the fact that the writing surface is a two-layer laminate written upon by pressure on both layers and erased by separating them, and wherein said wiper is positioned between said layers and is manually swingable downwardly into the zone of the said window where an answer is written.

7. Device according to claim 1 characterized by the fact that the bottom plate and the cover plate are firmly connected.

8. Device according to claim 1 characterized by the fact that the writing surface erasing device is arranged directly next to the window and that it can be swung into the window in order to erase the writing tablet in the area of the window by means of a handle.

9. Device according to claim 4 characterized by the fact that a middle part of the cover plate can be flipped up for the purpose of changing learning program sheets.

* * * * *

REEXAMINATION CERTIFICATE (6th)

United States Patent [19]
Kunert

[11] B1 3,751,826

[45] Certificate Issued Apr. 13, 1982

[54] DEVICE FOR THE APPLICATION OF PRINTED LEARNING PROGRAMS

[76] Inventor: Heinz Kunert, Belvenerestr. 15, Cologne, Fed. Rep. of Germany

Reexamination Request
No. 90/000,013, Jul. 1, 1981

Reexamination Certificate for:
Patent No.: 3,751,826
Issued: Aug. 14, 1973
Appl. No.: 177,793
Filed: Sep. 3, 1971

[30] Foreign Application Priority Data
Sep. 28, 1970 [Fed. Rep. of Germany ...... 2047599

[51] Int. Cl.³ .............................................. G09B 3/02
[52] U.S. Cl .......... 434/349; 434/192; 434/410; 434/417
[58] Field of Search ... 434/348, 349, 410, 416, 417, 192; 346/21

[56] References Cited

U.S. PATENT DOCUMENTS

| | | | |
|---|---|---|---|
| 1,177,652 | 4/1916 | Robertson | 434/404 X |
| 1,641,982 | 9/1927 | McDade | 434/348 |
| 3,011,854 | 12/1961 | Allen | 346/21 |
| 3,146,531 | 9/1964 | Whitney | 35/9 |
| 3,284,924 | 11/1966 | Parmenter | 35/9 |
| 3,512,269 | 5/1970 | Kunert | 35/9 |

*Primary Examiner*—William H. Grieb

[57] ABSTRACT

A programmed learning device employing a plurality of rotating discs with questions and answers provided thereon and an eraseable surface with cooperating eraser in a housing provided with windows.

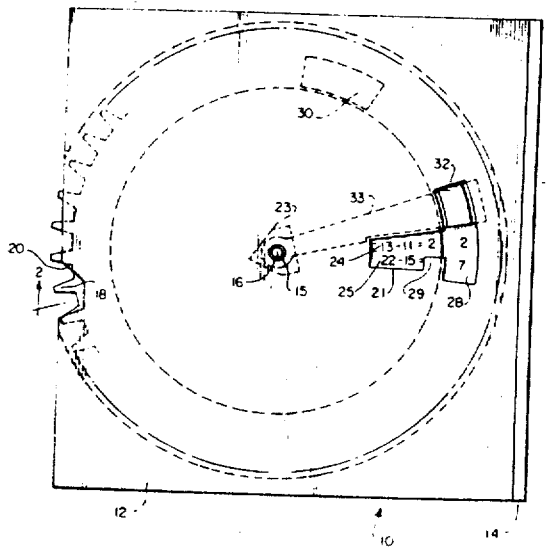

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *